(12) United States Patent
Schreiber

(10) Patent No.: US 8,221,087 B2
(45) Date of Patent: Jul. 17, 2012

(54) STATOR VANES OF A STATOR VANE CASCADE OF AN AIRCRAFT GAS TURBINE

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 606 days.

(21) Appl. No.: 12/453,130

(22) Filed: Apr. 29, 2009

(65) Prior Publication Data

US 2010/0080710 A1 Apr. 1, 2010

(30) Foreign Application Priority Data

Apr. 30, 2008 (DE) .................. 10 2008 021 684

(51) Int. Cl.
*B63H 1/36* (2006.01)
*B64C 27/16* (2006.01)
*F03B 3/12* (2006.01)

(52) U.S. Cl. .................. 416/241 A; 416/224
(58) Field of Classification Search .......... 416/224, 416/229 R, 241 A; 415/191, 200, 208.1, 415/209.4, 1

See application file for complete search history.

(56) References Cited

U.S. PATENT DOCUMENTS

| | | | |
|---|---|---|---|
| 2,175,204 A | 10/1939 | Lougheed | |
| 2,728,702 A * | 12/1955 | Simon et al. | 244/126 |
| 4,301,584 A | 11/1981 | Dillner et al. | |
| 4,860,425 A | 8/1989 | Kunisaki et al. | |
| 5,791,879 A * | 8/1998 | Fitzgerald et al. | 416/229 A |
| 6,139,278 A * | 10/2000 | Mowbray et al. | 416/229 A |
| 6,196,794 B1 * | 3/2001 | Matsumoto | 415/191 |
| 6,532,658 B2 | 3/2003 | Schreiber | |
| 6,821,087 B2 * | 11/2004 | Matsumoto et al. | 415/191 |
| 7,156,622 B2 | 1/2007 | Schreiber | |
| 2003/0185673 A1 * | 10/2003 | Matsumoto et al. | 415/159 |
| 2008/0152858 A1 | 6/2008 | Schreiber | |
| 2009/0081032 A1 * | 3/2009 | Moroso et al. | 415/200 |
| 2009/0297356 A1 * | 12/2009 | Moroso | 416/226 |
| 2011/0110772 A1 * | 5/2011 | Arrell et al. | 415/177 |

FOREIGN PATENT DOCUMENTS

| | | |
|---|---|---|
| DE | 24 44 267 | 4/1975 |
| DE | 43 20 374 | 12/1994 |
| DE | 43 20 374 A1 | 12/1994 |
| DE | 197 26 911 | 1/1999 |

(Continued)

OTHER PUBLICATIONS

UWE Hessler: "Die Bedeutung der Luftfahrtregion III fur Rolls-Royce Deustchland" Innovationsforum "Flugtriebwerkstechnik in Brandenburg", [Online] 7, Dec. 2004, Seiten 1-23, XP002540236 Gufunden im Internet: URL:http://www.tu-cottbus.de/Triebwerkstechnik/pdf/hessler.pdf> [gefunden am Aug. 4, 2009].

(Continued)

*Primary Examiner* — S. V Clark
(74) *Attorney, Agent, or Firm* — Timothy J. Klima; Shuttlesworth & Ingersoll, PLC

(57) ABSTRACT

A method for manufacturing a stator vane 7 of a stator vane cascade 6 of a fan structure of an aircraft gas turbine, includes circumferentially welding two essentially flat metallic sheets 10, 11. A space between the sheets 10, 11 is formed in an injection mold by a filling pressure during a plastics injection process.

16 Claims, 5 Drawing Sheets

FOREIGN PATENT DOCUMENTS

Figure 1:
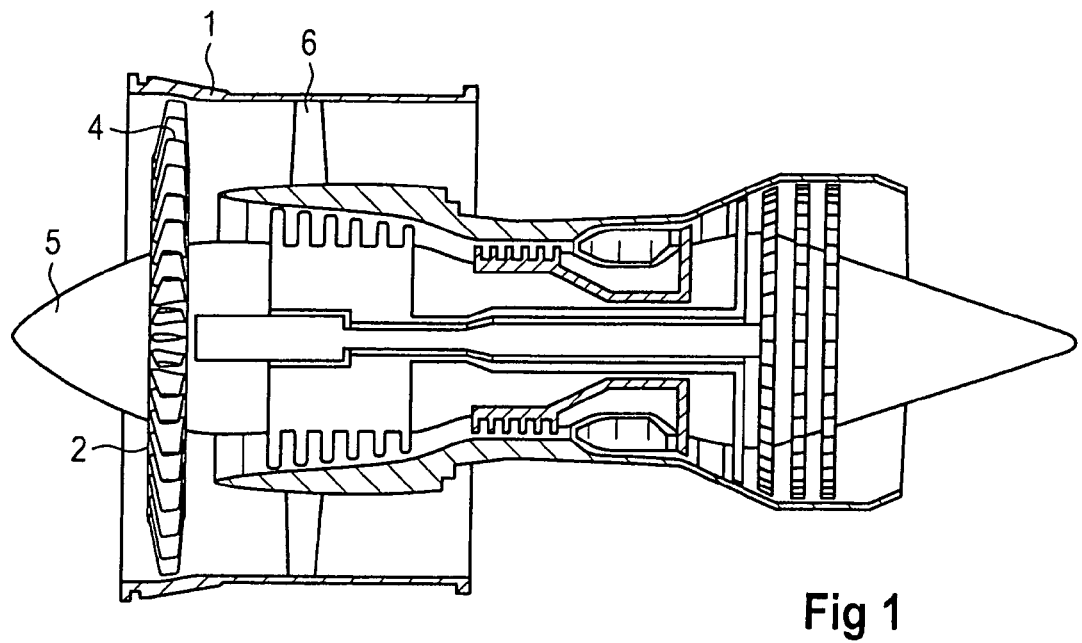

| | | |
|---|---|---|
| DE | 197 26 911 A1 | 1/1999 |
| DE | 199 59 598 A1 | 6/2001 |
| EP | 1 106 783 | 6/2001 |
| EP | 1 450 006 | 8/2004 |
| EP | 1 939 403 | 7/2008 |
| JP | 09 125905 | 5/1997 |
| WO | 2005/109984 | 11/2005 |

OTHER PUBLICATIONS

European Search Report dated Aug. 27, 2009 from counterpart application.

* cited by examiner

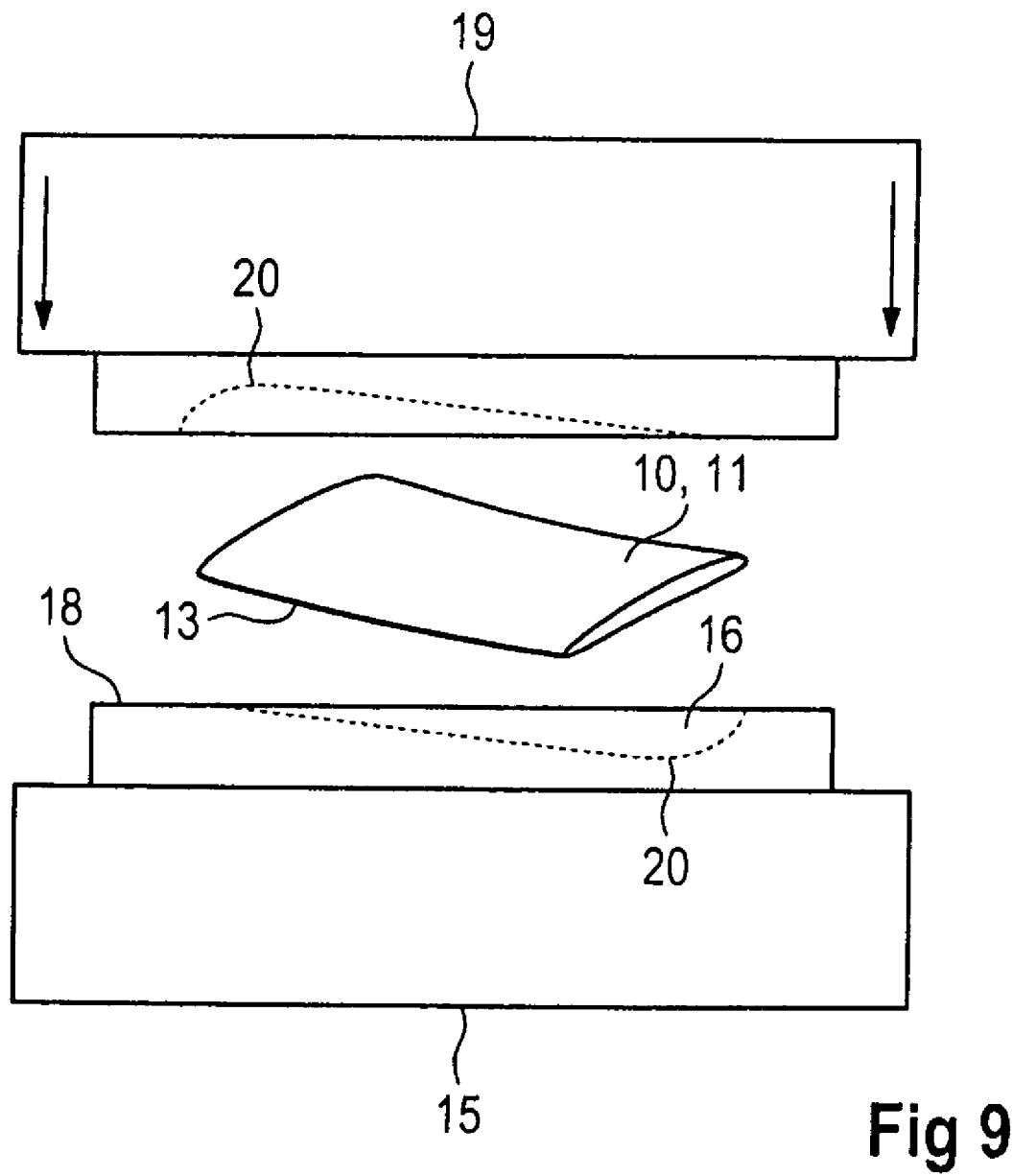

STATOR VANES OF A STATOR VANE CASCADE OF AN AIRCRAFT GAS TURBINE

This application claims priority to German Patent Application DE102008021684.4 filed Apr. 30, 2008, the entirety of which is incorporated by reference herein.

The present invention relates to a method for the manufacture of a stator vane of a stator vane cascade of a fan structure of an aircraft gas turbine and to the design of such a stator vane.

Turbofan gas-turbine engines have a relatively large fan rotor which also produces an airflow around the core engine. A stator vane cascade is arranged downstream of the fan rotor to axially direct the airflow with minimum swirl.

The vanes of the stator vane cascade must, on the one hand, have adequate mechanical strength, and, on the other hand, optimum damping characteristics, as they are subject to vibration.

The state of the art shows stator vanes which are provided as metal castings. These are disadvantageous in that they are relatively heavy and, with regard to the residual stress, susceptible to cracking during repair.

Alternatively, the state of the art shows stator vanes which are made of titanium materials. These have relatively high weight and are very cost-intensive. Furthermore, they have unsatisfactory self-damping characteristics.

Long fiber-reinforced vanes with organic matrix and metal-coated leading edge are a further alternative.

A broad aspect of the present invention is to provide a stator vane of a stator vane cascade of a fan structure of an aircraft gas turbine, which while being simply designed features low weight and good self-damping characteristics.

In accordance with the present invention, it is therefore provided that the vane has metallic sheeting on its external surfaces, while the core is made of plastic material.

With regard to the method according to the present invention, two thin-gauge, essentially flat, foil-type sheets are placed on each other and circumferentially welded. These form a pocket or space into which plastic material is injected by an injection molding process. With the sheets being inserted in a suitable injection mold and deformed during the injection molding process, an internal high-pressure forming method is obtained. This method enables the complex, three-dimensional structure of the vanes to be produced in a single operation and, simultaneously, the mold space between the sheets to be completely filled with plastic material.

Injection is preferably performed at a pressure of 600 bars.

The plastic material used can, for example, be polyamide filled with a fibrous reinforcement, for example milled glass fibers.

In the injection molding process according to the present invention, the plastic material is injected through a pressure nozzle into the space enclosed by the two sheets, so that the metal sheeting constitutes a pressure vessel during the forming process.

The sheets, which are circumferentially welded, are subsequently mechanically machined along the weld to provide for an optimum inflow and outflow edge of the finished stator vane. The radially outer and radially inner area can be shortened or cut back as appropriate to enable the stator vane to be inserted in the usual manner in an outer ring or an inner ring, respectively, of the stator vane cascade and adhesively bonded or otherwise attached there.

The sheeted surface provides for high erosion resistance. Furthermore, the two sheets form a torsion box which has a high structural strength, a high surface moment of inertia and a high modulus of elasticity. Therefore, impact capability, for example in the event of a bird strike, is very high.

Compared with stator vanes made in mere carbon-fiber structure, the present invention provides for a weight reduction of approx. 20 percent.

Furthermore, the method according to the present invention can be cost-effectively performed since forming and molding of the vane are accomplished in one injection molding process. It is understood that a forming and injection molding tool can be designed for simultaneous production of several vanes.

The two welded sheets can have different size such that the edge of a larger sheet protruding beyond the weld is used for retaining and clamping in the injection mold by a hold-down device. This enables the internal high-pressure forming process to be optimized.

With regard to the injection molding process, it is favorable that the injection mold is sized slightly larger during the injection molding process to compensate for resilience during solidification of the plastic material. This enables a dimensionally fitting stator vane to be produced. In accordance with the present invention, the production process of the stator vane can be automated, enabling the injection molding operation as well as insertion and removal to be performed fully automatically. This also leads to a considerable reduction in the manufacturing costs.

It is further advantageous that an inner side of each sheet is mechanically roughened and/or pre-treated with a primer to improve adhesion between the metal and the plastic material.

In a further advantageous embodiment, it is provided that the sheets are welded in a non-plane tool to preset different sheet profile lengths of the pressure and suction side.

Figure 2:
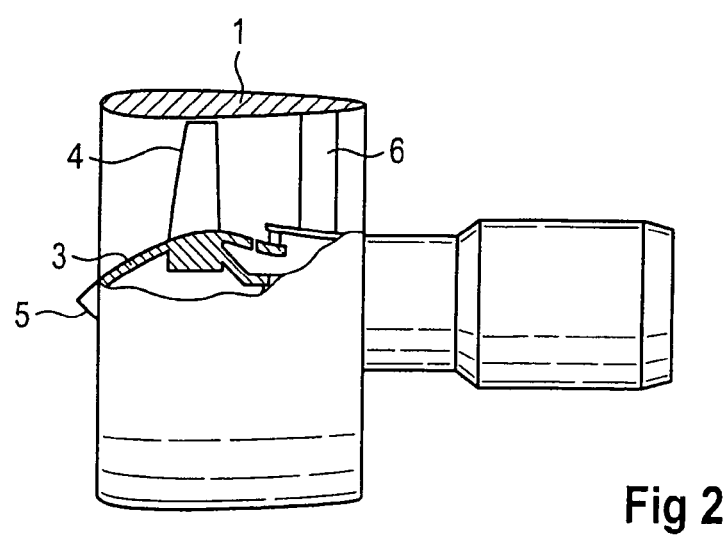
Figure 3:
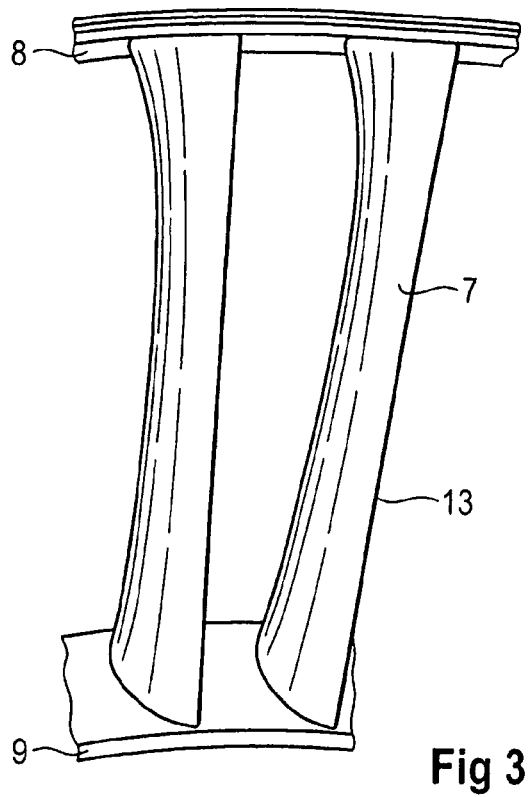
Figure 4:
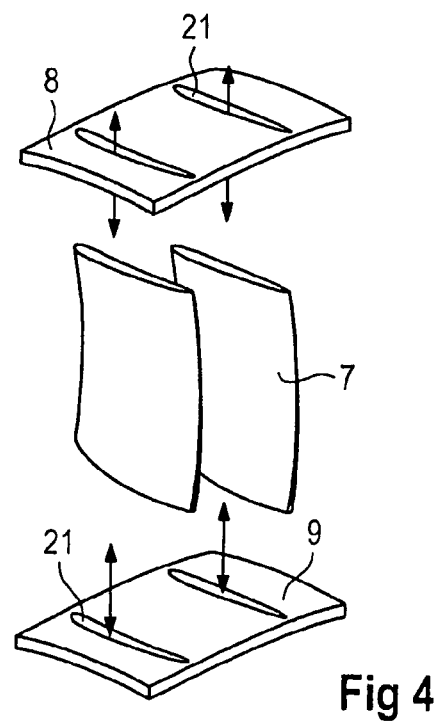
Figure 5:
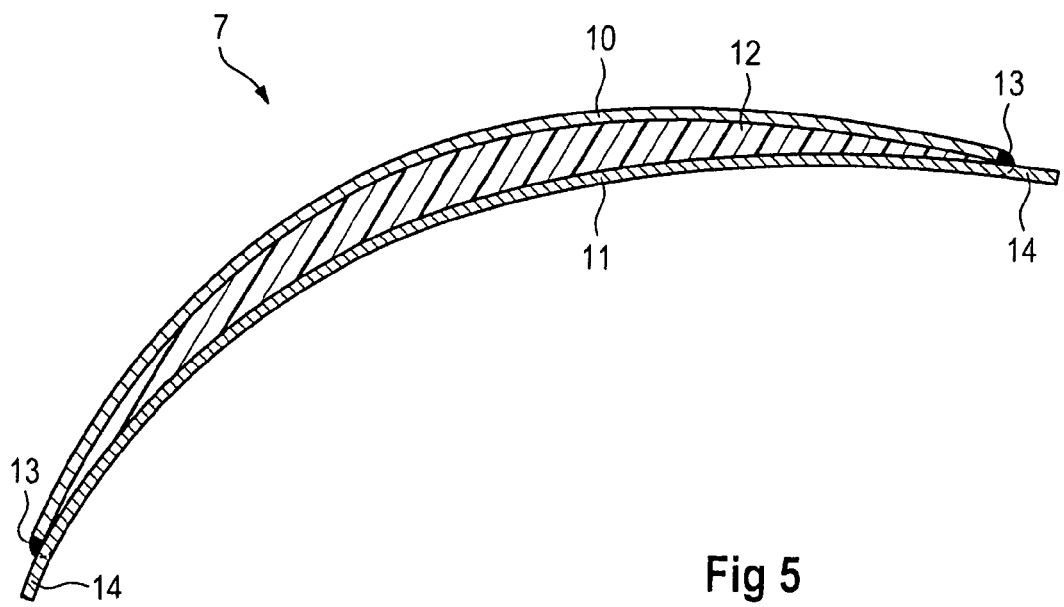
Figure 6:
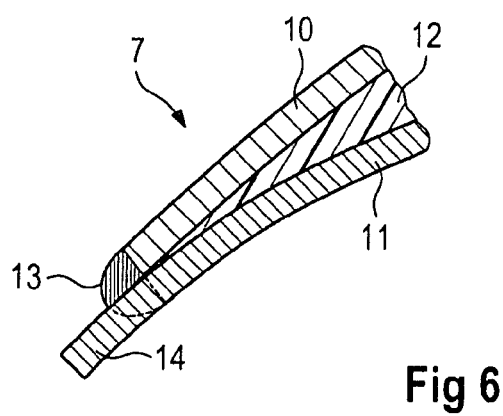
Figure 7:
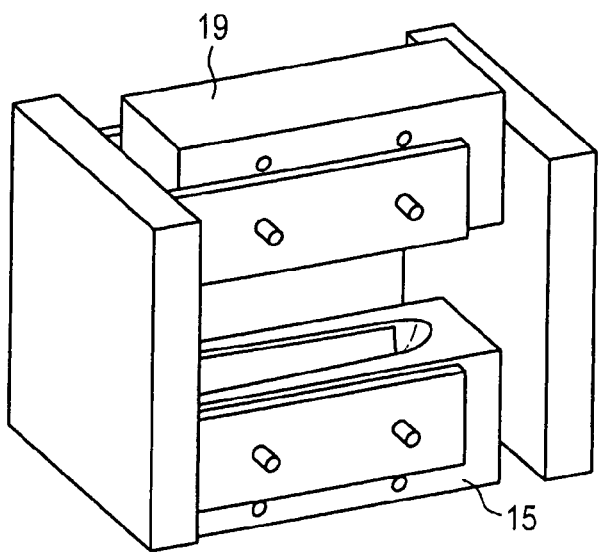
Figure 8:
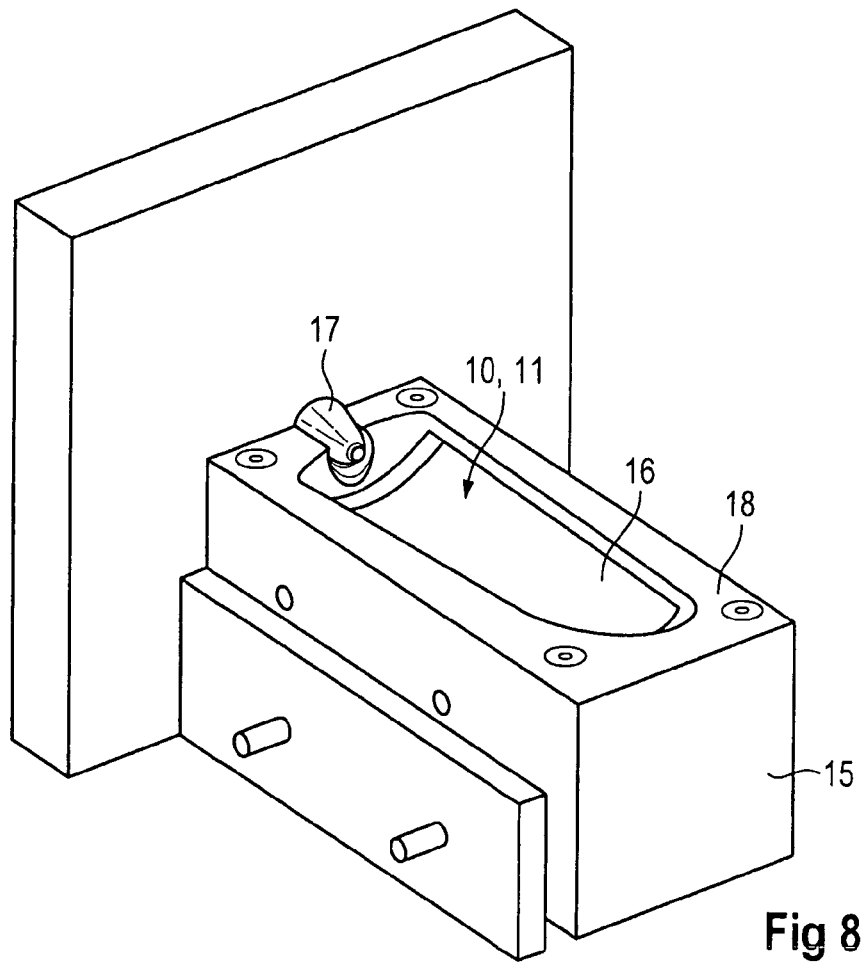

The present invention is more fully described in light of the accompanying drawings showing a preferred embodiment. In the drawings, FIG. 1 is a first simplified schematic representation of a turbofan gas-turbine engine, FIG. 2 is a second simplified schematic representation of a turbofan gas-turbine engine, FIG. 3 is a perspective view of a stator vane element, FIG. 4 is a further view of a stator vane element, FIG. 5 is a sectional view of a stator vane according to the present invention, FIG. 6 is an enlarged representation as per FIG. 5, FIG. 7 is a perspective representation of an injection mold, FIG. 8 is an enlarged representation of an appertaining female mold, and FIG. 9 is a side view of the injection mold.

The turbofan gas-turbine engine shown in FIG. 1 includes a fan rotor 2 which is disposed in a fan casing 1 and driven by a low-pressure turbine via a low-pressure shaft and has fan blades 4 arranged on a fan disk 3 (FIG. 2) and a one-piece inlet cone 5 axially held on the fan disk 3.

FIG. 2 again shows a turbofan gas-turbine engine. The fan disk 3 is well visible here.

Downstream of the fan rotor, a stator vane cascade 6 is arranged which usually includes individual segments, actually an outer ring segment 8 and an inner ring segment 9 (FIG. 3) between which two or three stator vanes 7 (guide vanes) are fitted. These segments are individually pre-manufactured and inserted upon assembly.

The stator vanes 7 have three-dimensional shape, with the radially outer and the radially inner vane root being inserted and welded, adhesively bonded or otherwise attached in a recess 21 (FIG. 4) provided in the outer ring 8 or in the inner ring 9, respectively.

FIG. 4 shows the recesses 21 for the stator vanes 7 in the inner ring 9 and in the outer ring 8.

FIG. 5 shows a schematic sectional view of a stator vane 7 according to the present invention. It is made of a first sheet 10 and a second sheet 11, with the sheets being made of stainless steel or on titanium basis and joined by welds 13. In the example, the second sheet 11 is sized larger to provide a protruding rim 14 which is retainable by a hold-down device of a mold during the forming and injection molding process.

The two sheets 10 and 11 are initially foil-type and flat and enclose a space into which plastic material is injected. Upon hardening, this plastic material forms a core 12, as shown in FIG. 5. Thus, a stable, three-dimensional structure is obtained.

The weld 13 is mechanically reworked, for example ground, after forming and injection molding, as indicated by the dotted line in FIG. 6. In the process, the protruding rim 14 is removed such that an aerodynamically optimized inflow edge or outflow edge, respectively, is provided.

FIGS. 7, 8 and 9 show an example of an injection mold to be used. In FIG. 8, a female mold 15 with a mold cavity 16 is illustrated into which (schematically shown) the weld-joined sheets 10, 11 are insertable. Furthermore, an injection nozzle 17 is provided through which plastic material is injectable into the space or pocket between the sheets 10, 11. Reference numeral 18 indicates a hold-down surface at which the protruding rim 14 is retained during the forming process.

FIG. 7 illustrates the association of the female mold 15 to an analogically designed male mold 19 in the opened state.

FIG. 9 shows the injection mold in side view. Shown here is the contour 20 of the mold cavity 16 in the male mold 19 and the female mold 15.

LIST OF REFERENCE NUMERALS

1 Fan casing
2 Fan rotor
3 Fan disk
4 Fan blade
5 Inlet cone
6 Stator vane cascade
7 Stator vane/guide vane
8 Outer ring
9 Inner ring
10 First sheet
11 Second sheet
12 Core
13 Weld
14 Protruding rim
15 Female mold
16 Mold cavity
17 Injection nozzle
18 Hold-down surface
19 Male mold
20 Contour
21 Recess

What is claimed is:

1. A method for manufacturing a stator vane of a stator vane cascade of a fan structure of an aircraft gas turbine, comprising:
   circumferentially welding two essentially flat metallic sheets;
   forming a space between the sheets in an injection mold with a filling pressure during a plastics injection process;
   injecting plastic material into the space by an injection molding process to create the filling pressure and thereby forming the sheets in a mold cavity of the injection mold by filling the space with the plastic material.

2. The method of claim 1, wherein the welds are mechanically machined after the injection molding process.

3. The method of claim 2, wherein at least one edge of the stator vane filled with plastic material is formed by cutting off a partial area.

4. The method of claim 2, wherein at least one side of the stator vane filled with plastic material is shortened by cutting off a partial area.

5. The method of claim 4, wherein the injection molding is performed at an internal pressure of approximately 600 bars.

6. The method of claim 5, wherein polyamide is used as the plastic material.

7. The method of claim 6, wherein the plastic material includes provided with a fibrous reinforcement.

8. The method of claim 6, wherein the plastic material is free of fibrous reinforcement.

9. The method of claim 1, wherein the sheets are of a foil type.

10. The method of claim 1, wherein the sheets are made of at least one of titanium and a titanium material.

11. The method of claim 1, wherein the sheets are made of stainless steel.

12. The method of claim 1, wherein an inner side of each sheet is at least one of mechanically roughened and pretreated with a primer to improve adhesion between the metal and the plastic material.

13. The method of claim 1, wherein the sheets are welded in a non-plane tool to preset different sheet profile lengths of the pressure and suction side.

14. The method of claim 1, wherein the sheets are formed in a mold cavity of an injection mold and filled with plastic material.

15. The method of claim 1, wherein, after welding the two sheets a protruding rim is formed and the protruding rim is used to clamp the metallic sheets in the mold and subsequently, the protruding rim is cut off.

16. The method of claim 1, wherein the injection molding is performed at an internal pressure of approximately 600 bars.

* * * * *